United States Patent
Brück

(10) Patent No.: US 11,549,545 B2
(45) Date of Patent: Jan. 10, 2023

(54) FASTENING ASSEMBLY AND A CORRESPONDING SWITCH CABINET HOUSING

(71) Applicant: RITTAL GMBH & CO. KG, Herborn (DE)

(72) Inventor: Daniel Brück, Sinn (DE)

(73) Assignee: RITTAL GMBH & CO. KG, Herborn (DE)

( * ) Notice: Subject to any disclaimer, the term of this patent is extended or adjusted under 35 U.S.C. 154(b) by 292 days.

(21) Appl. No.: 16/500,861

(22) PCT Filed: Feb. 14, 2018

(86) PCT No.: PCT/DE2018/100134
§ 371 (c)(1),
(2) Date: Oct. 4, 2019

(87) PCT Pub. No.: WO2018/192605
PCT Pub. Date: Oct. 25, 2018

(65) Prior Publication Data
US 2020/0124078 A1    Apr. 23, 2020

(30) Foreign Application Priority Data

Apr. 19, 2017    (DE) .................... 10 2017 108 335.9

(51) Int. Cl.
*F16B 37/04*    (2006.01)
*F16B 37/02*    (2006.01)
*H02B 1/01*    (2006.01)

(52) U.S. Cl.
CPC ............ *F16B 37/044* (2013.01); *F16B 37/02* (2013.01); *F16B 37/041* (2013.01);
(Continued)

(58) Field of Classification Search
CPC ...... F16B 37/044; F16B 37/043; F16B 37/02; F16B 37/041; F16B 41/002; H02B 1/012;
(Continued)

(56) References Cited

U.S. PATENT DOCUMENTS 2,065,843 A * 12/1936 Van Uum ............... F16L 3/127
248/73
2,303,148 A * 11/1942 Tinnerman ............ F16B 37/043
411/111
(Continued)

FOREIGN PATENT DOCUMENTS

CN          202488919 U       10/2012
CN          102884688 A        1/2013
(Continued)

OTHER PUBLICATIONS

Rittal GMBH & Co.: Handbuch 33. Ausgabe 2011/2012, Herborn 2012, S. 665.—Firmenschrift.
(Continued)

*Primary Examiner* — Jonathan Liu
*Assistant Examiner* — Taylor Morris
(74) *Attorney, Agent, or Firm* — Harness, Dickey & Pierce, P.L.C.

(57) ABSTRACT

The invention relates to a fastening arrangement including a profiled strut and a plug-in nut mounted in an aperture of the profile strut, wherein the plug-in nut has a threaded nut held on a clasp, wherein the clasp has a first and a second actuating end, via which the plug-in nut projects out of the aperture, wherein in a locking position of the actuating ends relative to each other an edge of the aperture is received in a receptacle of the clasp. Additionally, a corresponding switch cabinet housing is disclosed.

13 Claims, 8 Drawing Sheets

(52) U.S. Cl.
CPC ........... *F16B 37/043* (2013.01); *H02B 1/012* (2013.01); *H02B 1/01* (2013.01); *H02B 1/013* (2013.01)

(58) Field of Classification Search
CPC .......... H02B 1/013; H02B 1/01; H05K 7/183; H05K 7/18; H05K 5/0217
See application file for complete search history.

(56) References Cited

U.S. PATENT DOCUMENTS

| | | | | |
|---|---|---|---|---|
| 2,376,167 A * | 5/1945 | Mitchell | ............... | F16B 37/043 411/173 |
| 2,394,729 A * | 2/1946 | Tinnerman | ............ | F16B 37/044 411/112 |
| 2,495,037 A * | 1/1950 | Tinnerman | ............ | F16B 37/044 411/112 |
| 2,552,499 A * | 5/1951 | Tinnerman | ............ | F16B 37/044 411/970 |
| 2,631,634 A * | 3/1953 | Tinnerman | ............ | F16B 37/044 411/113 |
| 2,633,886 A * | 4/1953 | Tinnerman | ............ | F16B 37/041 411/112 |
| 2,649,126 A * | 8/1953 | Tinnerman | ............ | F16B 37/044 411/113 |
| 2,655,072 A * | 10/1953 | Ougljesa | ................ | F16B 2/243 411/548 |
| 2,661,821 A * | 12/1953 | Tinnerman | ............. | F16B 37/04 403/21 |
| 2,678,075 A * | 5/1954 | Murphy | ................ | F16B 37/044 411/113 |
| 2,695,046 A * | 11/1954 | Tinnerman, III | ...... | F16B 37/044 411/970 |
| 2,724,419 A * | 11/1955 | Poupitch | .............. | F16B 37/044 411/113 |
| 2,727,552 A * | 12/1955 | Chvesta | ................ | F16B 37/044 411/112 |
| 2,853,113 A * | 9/1958 | Balint | .................... | F16B 37/044 411/103 |
| 2,867,258 A * | 1/1959 | Flora | ..................... | F16B 37/044 411/113 |
| 2,875,804 A * | 3/1959 | Flora | ..................... | F16B 37/044 411/427 |
| 2,875,805 A * | 3/1959 | Flora | ..................... | B60Q 1/045 411/111 |
| 2,883,228 A * | 4/1959 | Roberts, Jr. | ........... | G09F 3/0323 292/256.71 |
| 2,908,311 A * | 10/1959 | Garman | ................ | F16B 37/044 411/103 |
| 2,941,768 A * | 6/1960 | Elms | ..................... | F16L 3/1233 248/71 |
| 3,025,897 A * | 3/1962 | Gieleghem | ........... | F16B 37/044 411/113 |
| 3,035,624 A * | 5/1962 | Jaworski | .............. | F16B 37/044 411/112 |
| 3,060,988 A * | 10/1962 | Munse | ................. | F16B 37/041 411/103 |
| 3,066,903 A * | 12/1962 | Tinnerman | ................ | F16B 2/08 248/300 |
| 3,110,338 A * | 11/1963 | Rapata | ................. | F16B 37/041 411/182 |
| 3,110,372 A * | 11/1963 | Pierce | .................... | F16B 37/043 403/21 |
| 3,118,480 A * | 1/1964 | Kreider | ................ | F16B 37/041 411/173 |
| 3,192,823 A * | 7/1965 | Munse | ................. | F16B 37/044 411/970 |
| 3,645,311 A * | 2/1972 | Tinnerman | ............ | F16B 37/041 411/173 |
| 3,738,406 A * | 6/1973 | Williams | ................ | F16B 39/02 411/112 |
| 4,250,732 A * | 2/1981 | Moryl | .................... | F16B 37/044 411/108 |
| 4,334,659 A * | 6/1982 | Yuda | ..................... | F16B 21/086 24/17 AP |
| 4,488,844 A * | 12/1984 | Baubles | ................ | F16B 37/045 411/103 |
| 4,606,688 A * | 8/1986 | Moran | ................. | B60Q 1/0433 411/175 |
| 4,643,319 A * | 2/1987 | Debus | ..................... | H02B 1/01 211/189 |
| 4,828,440 A * | 5/1989 | Anderson | ............. | F16B 37/043 411/104 |
| 4,875,816 A * | 10/1989 | Peterson | ............... | F16B 37/043 411/104 |
| 4,925,351 A * | 5/1990 | Fisher | .................. | F16B 37/043 411/182 |
| 4,958,792 A * | 9/1990 | Rinderer | ................... | F16L 3/13 24/457 |
| 5,101,540 A * | 4/1992 | Roof | ...................... | B60Q 1/302 24/293 |
| 5,193,643 A * | 3/1993 | McIntyre | ................ | B60G 99/00 180/312 |
| 5,202,818 A * | 4/1993 | Betsch | .................... | H05K 7/183 361/829 |
| 5,250,752 A * | 10/1993 | Cutright | ............... | H05K 9/0062 174/363 |
| 5,533,696 A * | 7/1996 | Laughlin | .................... | F16L 3/12 248/74.1 |
| 5,624,319 A * | 4/1997 | Golczyk | ................ | B21D 53/24 470/21 |
| 5,807,008 A * | 9/1998 | Schwenk | .......... | H05K 7/183 312/265.1 |
| 5,894,106 A * | 4/1999 | Schwenk | ................ | H01R 4/64 174/50 |
| 5,971,686 A * | 10/1999 | Stewart | ................ | F16B 37/041 411/113 |
| 6,012,791 A * | 1/2000 | Benner | ................. | H02B 1/301 312/265.2 |
| 6,042,395 A * | 3/2000 | Munch | ...................... | H01R 4/64 439/92 |
| 6,120,206 A * | 9/2000 | Benner | ................. | A47B 47/03 403/231 |
| 6,123,400 A * | 9/2000 | Nicolai | ................. | H02B 1/301 312/265.1 |
| 6,161,804 A * | 12/2000 | Paske | ....................... | H02G 3/32 248/74.1 |
| 6,164,985 A * | 12/2000 | Reuter | ..................... | H01R 4/64 361/800 |
| 6,270,281 B1 * | 8/2001 | Ruusuvuori | ......... | H05K 7/1425 211/182 |
| 6,283,689 B1 * | 9/2001 | Roytberg | ................ | F16B 37/02 411/182 |
| 6,457,924 B1 * | 10/2002 | Wallace | ................ | F16B 37/043 174/58 |
| 6,644,713 B2 * | 11/2003 | Del Pozo Abejon | .. | B60N 3/026 296/146.7 |
| 6,709,182 B1 * | 3/2004 | De Jong | ................. | F16B 37/02 403/12 |
| 6,746,193 B1 * | 6/2004 | Drake | ................... | F16B 37/043 211/182 |
| 6,758,645 B2 * | 7/2004 | Curley, Jr. | ............ | F16B 37/044 411/107 |
| 6,808,240 B2 * | 10/2004 | Altena | ..................... | H02B 1/01 312/223.1 |
| 6,926,378 B2 * | 8/2005 | Greenwald | .......... | H05K 7/1421 312/223.1 |
| 7,147,418 B2 * | 12/2006 | Clinch | ................... | F16B 37/044 411/432 |
| 7,204,666 B2 * | 4/2007 | Hullman | ................ | F16B 37/067 411/111 |
| 7,568,870 B2 * | 8/2009 | Paquet | .................. | F16B 37/043 411/177 |
| 8,083,450 B1 * | 12/2011 | Smith | ................. | F16B 37/0842 411/112 |
| 8,128,183 B2 * | 3/2012 | Shen | ..................... | H05K 7/183 312/265.4 |
| 8,177,466 B2 * | 5/2012 | Csik | ..................... | F16B 37/044 411/174 |

(56) References Cited

U.S. PATENT DOCUMENTS

| | | | |
|---|---|---|---|
| 8,235,634 B2* | 8/2012 | Larsen | F16B 27/00 411/112 |
| 8,459,918 B2* | 6/2013 | Lin | F16B 37/044 411/112 |
| 9,871,353 B2 | 1/2018 | Boehme et al. | |
| 9,903,407 B2* | 2/2018 | Hattori | F16B 37/043 |
| 9,991,684 B2 | 6/2018 | Brueck et al. | |
| 10,277,014 B2 | 4/2019 | Brueck et al. | |
| 10,337,550 B2* | 7/2019 | Davis | F16B 37/043 |
| 10,396,531 B2 | 8/2019 | Reuter et al. | |
| 10,483,724 B2* | 11/2019 | Reuter | H02B 1/013 |
| 10,601,205 B2* | 3/2020 | Reuter | A47B 96/1408 |
| 10,811,854 B2* | 10/2020 | Boehme | H02B 1/32 |
| 11,085,482 B2* | 8/2021 | Schlenker | F16B 37/045 |
| 2004/0028498 A1* | 2/2004 | Fleydervish | F16B 37/02 411/55 |
| 2005/0169727 A1* | 8/2005 | Cosenza | F16B 37/044 411/120 |
| 2005/0226700 A1* | 10/2005 | Kosidlo, IV | F16B 37/043 411/173 |
| 2005/0271492 A1* | 12/2005 | Jackson, Jr. | F16B 37/02 411/112 |
| 2008/0028577 A1* | 2/2008 | Soman | F16B 21/075 24/293 |
| 2008/0247842 A1* | 10/2008 | Motsch | F16B 37/02 411/174 |
| 2013/0183117 A1* | 7/2013 | Warburton | F16B 33/002 411/119 |
| 2016/0176629 A1* | 6/2016 | Dang | F16B 37/0842 220/484 |
| 2016/0352080 A1 | 12/2016 | Brueck et al. | |
| 2016/0352082 A1 | 12/2016 | Boehme et al. | |
| 2016/0352083 A1 | 12/2016 | Brueck et al. | |
| 2016/0355144 A1* | 12/2016 | Horneck | F16B 5/02 |
| 2016/0363153 A1* | 12/2016 | Lakoduk | F16B 37/044 |
| 2017/0127555 A1* | 5/2017 | Anderson | H02B 1/301 |
| 2017/0167523 A1* | 6/2017 | Davis | F16B 37/043 |
| 2017/0280584 A1* | 9/2017 | Dampney | H05K 7/183 |
| 2017/0370395 A1* | 12/2017 | Mills | F16B 37/044 |
| 2018/0135673 A1* | 5/2018 | Binkert | F16B 37/043 |
| 2018/0180086 A1* | 6/2018 | Costabel | F16B 37/044 |
| 2018/0347614 A1* | 12/2018 | Reznar | F16B 37/046 |
| 2018/0375302 A1 | 12/2018 | Reuter et al. | |
| 2019/0157847 A1* | 5/2019 | Reuter | H02B 1/012 |
| 2019/0214798 A1 | 7/2019 | Schindler et al. | |
| 2019/0252866 A1 | 8/2019 | Reuter et al. | |
| 2019/0309789 A1* | 10/2019 | Mahaffey | F16B 37/043 |
| 2020/0284279 A1* | 9/2020 | Gao | E03F 5/06 |
| 2020/0347871 A1* | 11/2020 | Wilson | F16B 37/02 |
| 2021/0151960 A1* | 5/2021 | Schindler | H05K 7/183 |

FOREIGN PATENT DOCUMENTS

| | | | |
|---|---|---|---|
| CN | 105864263 A | 8/2016 | |
| DE | 19860434 A1 | 7/2000 | |
| DE | 19937892 C1 | 1/2001 | |
| DE | 102014212278 A1 * | 12/2015 | F16B 37/044 |
| EP | 2848827 A1 | 3/2015 | |

OTHER PUBLICATIONS

International Search Report (in English and German) and Written Opinion (in German) issued in PCT/DE2018/100134, dated May 11, 2018; ISA/EP.

U.S. Appl. No. 16/491,211, filed Sep. 5, 2019, Daniel Brück.

U.S. Appl. No. 16/606,079, filed Oct. 17, 2019, Boehme et al.

* cited by examiner

FASTENING ASSEMBLY AND A CORRESPONDING SWITCH CABINET HOUSING

CROSS-REFERENCE TO RELATED APPLICATIONS

This application is a 371 U.S. National Phase of International Application No. PCT/DE2018/100134, filed on Feb. 14, 2018, which claims the benefit of German Application No. 10 2017 108 335.9, filed on Apr. 19, 2017. The entire disclosures of the above applications are incorporated herein by reference.

BACKGROUND

This section provides background information related to the present disclosure which is not necessarily prior art.

TECHNICAL FIELD

The invention relates to a fastening arrangement comprising a profile strut and a plug-in nut mounted in an aperture of the profile strut, the plug-in nut having a threaded nut held on a clasp. Such a fastening arrangement is known from DE 199 37 892 C1. A similar fastening arrangement is also described in DE 198 60 434 A1.

DISCUSSION

State of the art fastening arrangements have the disadvantage that, especially when a bolt is screwed into the threaded nut of the plug-in nut, it may happen that the plug-in nut is twisted in the aperture of the profile strut and either the bolt cannot be screwed into the plug-in nut, or the bolt is jammed in the threaded nut of the plug-in nut.

SUMMARY

This section provides a general summary of the disclosure, and is not a comprehensive disclosure of its full scope or all of its features.

Therefore, it is an aspect of the invention to further improve a fastening arrangement of the type described above in such a way that it is securely seated in the aperture of the profile strut and thus preventing accidental twisting of the plug-in nut in the aperture.

Accordingly, a fastening arrangement of the type described above is provided such that the clasp has a first and a second actuating end via which the plug-in nut projects out of the aperture, wherein in a locking position of the actuating ends relative to each other an edge of the aperture is received in a receptacle of the clasp. By coupling the plug-in nut to the profile strut via the edge of the aperture engaging the receptacle of the clasp, accidental twisting of the plug-in nut is effectively prevented. The receptacle can be substantially U-shaped and formed on the first or second actuating end.

The receptacle can be arranged between the first or second actuating end and the threaded nut.

Furthermore, the clasp can be a shaped sheet metal part and the receptacle can be a U-shaped sheet metal folded edge. With the exception of the threaded nut, the plug-in nut can be a shaped sheet metal part obtained by punching and edging.

The receptacle may have boundary walls spaced apart from each other, of which a first boundary wall, in the locking position, is arranged in front of an inner side of the edge of the aperture, and of which a second boundary wall, in the locking position, is arranged in front of an outer side of the edge of the aperture, opposite the inner side. The edge of the aperture can thus be enclosed between the boundary walls of the receptacle, effectively preventing accidental twisting of the plug-in nut in the aperture.

At least one of the actuating ends may have in a portion, with which the actuating end passes through the aperture, a dimension in the longitudinal direction of the edge which is accommodated in the receptacle, which dimension substantially corresponds to a length of the edge in the longitudinal direction. This measure also contributes to securing the plug-in nut even further in the aperture, thus protecting it against accidental twisting. In a release position of the actuating ends relative to each other in which the actuating ends are displaced relative to each other compared to the locking position, the edge of the aperture may be out of engagement with the receptacle of the clasp. The displacement of the actuating ends from the locking position to the release position can in particular be carried out manually, whereby the actuating ends can be adapted to the type of actuation of the plug-in nut, in particular according to whether a tool-free actuation of the plug-in nut is to be carried out, or whether the displacement of the actuating ends between the release position and the locking position is to be carried out with the aid of a tool.

For example, it may be provided that the actuating ends each have a handle, whereby the handles protrude at a distance from each other through the aperture via an outer side of the profile strut and can be transferred from the locking position to a release position against mechanical preloading of the clasp. In particular the clasp can be a shaped sheet metal part which is arranged in a relaxed configuration in the locking position, so that a transfer of the plug-in nut into the release position can be associated with a manual or tool-bound preloading of the clasp, in particular with a compression of the clasp.

If the actuating ends have handles, it may in particular be provided that the plug-in nut is transferred to the release position by preloading the clasp by compressing the handles, i.e. bringing the handles closer together, so that the edge of the aperture is disengaged from the receptacle of the clasp. It may also be provided that the actuating ends are overlappingly arranged in front of a profile side of the profile strut having the aperture and have aligned tool openings.

The aligned tool openings can form a tool insertion opening which is delimited by a first boundary edge of a first tool opening of the tool openings and oppositely by a second boundary edge of a second tool opening of the tool openings. At least one of the aligned tool openings may have a toothing of a rack and pinion drive at a third boundary edge extending in the direction of an adjustment direction between the locking position and the release position of the actuating ends.

A fourth boundary edge opposite the third boundary edge may be arranged at a distance from the third boundary edge and may form a counter bearing for a toothed drive, in particular for a screwdriver with a multi-circular drive, also known as a "torx".

The other tool opening of the aligned tool openings can be formed circularly and have an inner diameter which substantially corresponds to an outer diameter of a toothed drive, in particular a multi-circular drive of a screwdriver.

The fastening arrangement can have an upper part and a lower part which are connected to each other at a distance from each other via a connecting section, wherein a first of the actuating ends forms a free end of the upper part and a second of the actuating ends forms a free end of the lower part, and wherein at least one of the upper part and the lower part has a projecting contact claw on its outside, in particular for potential equalization of the plug-in nut with the profile strut.

According to another aspect, a switch cabinet housing with a fastening arrangement of the aforementioned type is described, wherein the profile strut is either a profile strut of a frame of the switch cabinet housing or an interior component for the interior installation of the switch cabinet housing, in particular a mounting chassis.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Further details of the invention are described in the figures below. The following figures show FIG. 1 shows three embodiments of a plug-in nut according to the invention;

DETAILED DESCRIPTION

Example embodiments will now be described more fully with reference to the accompanying drawings.

Figure 1:
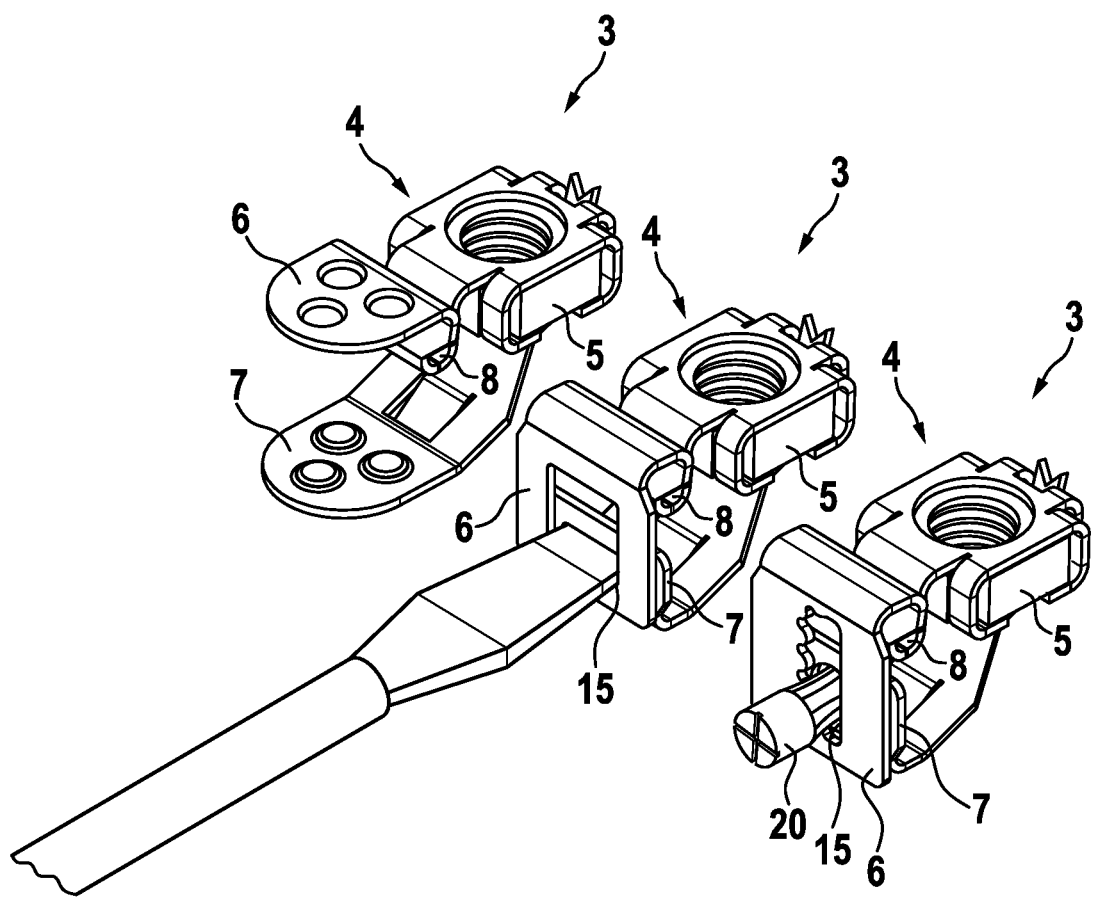

FIG. 1 shows three different embodiments of plug-in nuts 3 according to the invention, whereby these differ in particular in the design of the two actuating ends 6, 7. Common to all of the embodiments shown is that, with the exception of the threaded nut 5, they are formed as a shaped sheet metal part which is available by punching and edging. As a result, the plug-in nuts 3 shown in FIG. 1 are inexpensive to manufacture. Likewise, all of the embodiments shown in FIG. 1 show the receptacle 8 which is essential for the invention and which is intended to accommodate an edge of an aperture in which the respective plug-in nut 3 is inserted.

The plug-in nut 3 shown leftmost in FIG. 1 has actuating ends 6, 7 designed for manual actuation of the plug-in nut 3. All the plug-in nuts 3 in FIG. 1 are shown in their relaxed position where the clasp 4 of the plug-in nuts 3 is not preloaded. In this state, the plug-in nut 3 is in its locking position. By compressing the two actuating ends 6, 7 of the embodiment shown on the left in FIG. 1, the clasp 4 is preloaded and, accordingly, the plug-in nut 3 is transferred from the shown locking position to a release position in which an edge of an aperture of a profile strut taken up in receptacle 8 emerges from the receptacle and the plug-in nut 3 can thus be removed from the aperture via the actuating ends 6, 7.

For the abovementioned displacement of the actuating ends 6, 7 relative to one another in order to transfer the plug-in nut 3 between the shown locking position into a release position and to preload the clasp 4 in particular for this purpose, it is provided in the case of the plug-in nut 3 shown in the center of FIG. 1 that the actuating ends 6, 7 are arranged overlapping and form a tool insertion opening 15 in an overlapping region, into which opening a tool, here a slotted screwdriver 27, can be inserted. It is easily understood that by turning or swiveling the slotted screwdriver 27 by up to 90° from the adjusting position shown in FIG. 1, the actuating ends 6, 7 can be displaced relative to each other in such a way that the clasp 4 of the plug-in nut 3 is preloaded and thus any edge potentially accommodated in receptacle 8 can disengage from receptacle 8.

In variation to the previously described embodiment, the third embodiment of a plug-in nut 3 according to the invention shown on the bottom right of FIG. 1 has a rack and pinion drive at its actuating ends 6, 7, which can be actuated, for example, by means of a commercially available Torx screwdriver in order to bias the actuating ends 6, 7 against each other. The three aforementioned embodiments are described in more detail below.

Figure 2:
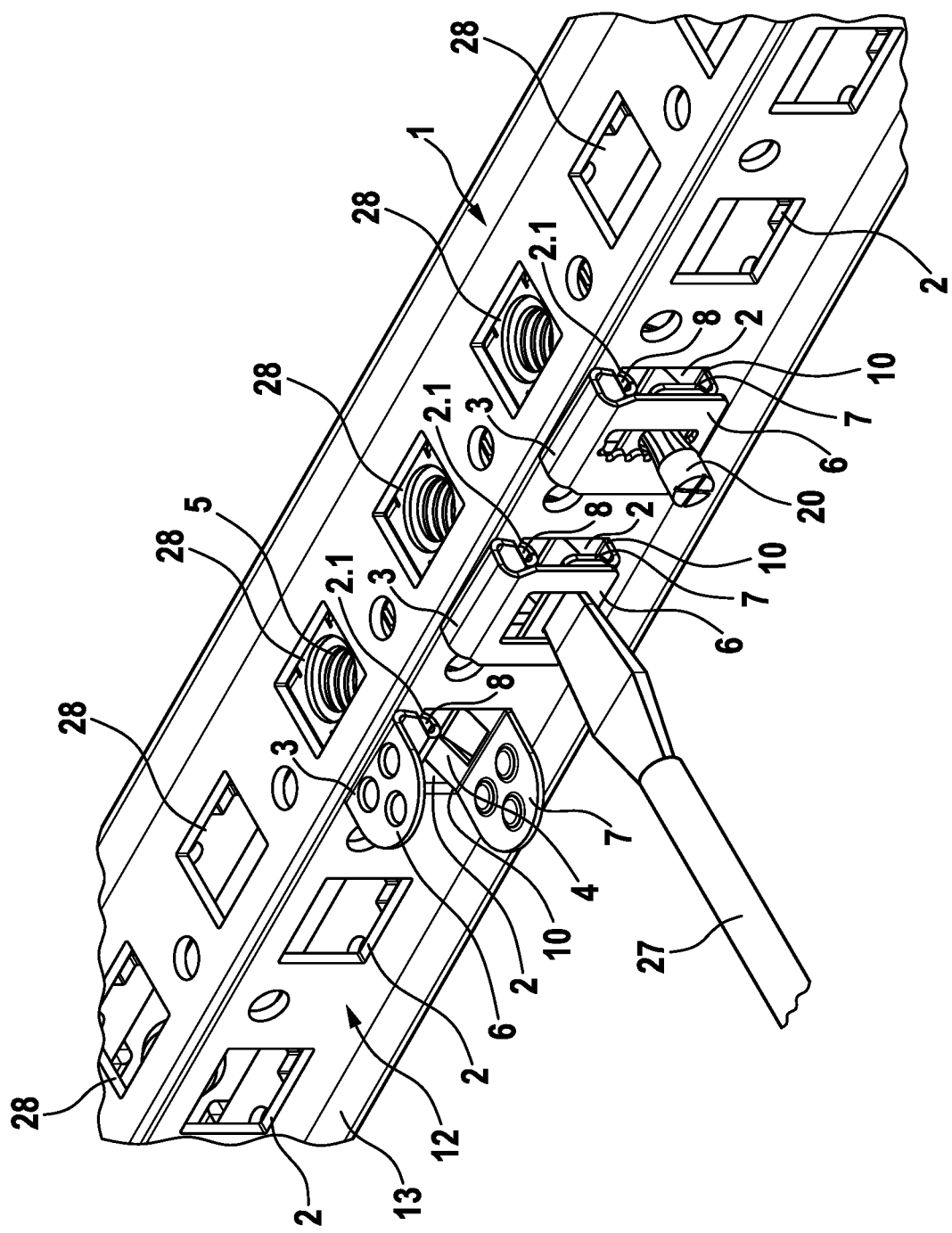
FIG. 2 shows a fastening arrangement employing the embodiments of the plug-in nuts according to the invention as shown in FIG. 1.

FIG. 2 shows the three designs known from FIG. 1 for a plug-in nut 3 according to the invention in an mounted state, i.e. in a state in which they are inserted into the profile strut 1 via a respective aperture 2 of a profile strut 1, the respective plug-in nut 3 protruding only via its actuating ends 6, 7 over the profile side 13 of the profile strut 1 having the aperture 2. On a further profile side arranged perpendicular to the profile side 13, the profile strut 1 has further apertures 28, with each of which the threaded nut 5 of the plug-in nut 3 is aligned, thereby making it accessible on the profile strut 1 for mounting e.g. a switchgear component for the internal installation of a switch cabinet housing.

FIG. 2 further shows that in the shown locking position of the actuating ends 6, 7 an edge 2.1 of the respective aperture 2 is accommodated in the receptacle 8 of the plug-in nut 3, so that the plug-in nut 3 is fixed both against displacement in the direction of insertion and against displacement around the direction of insertion and is thus accommodated in the aperture 2 in a non-rotatable manner. In a region 10 of the clasp 4 of the plug-in nut 3 adjoining the actuating ends 6, 7, the plug-in nut 3 has a dimension which corresponds precisely to a dimension of an edge 2.1 in its longitudinal direction, so that the positive locking achieved in the region 10 of the plug-in nut 3 provides a further securing of the plug-in nut 3 in the opening 2.

Figure 3:
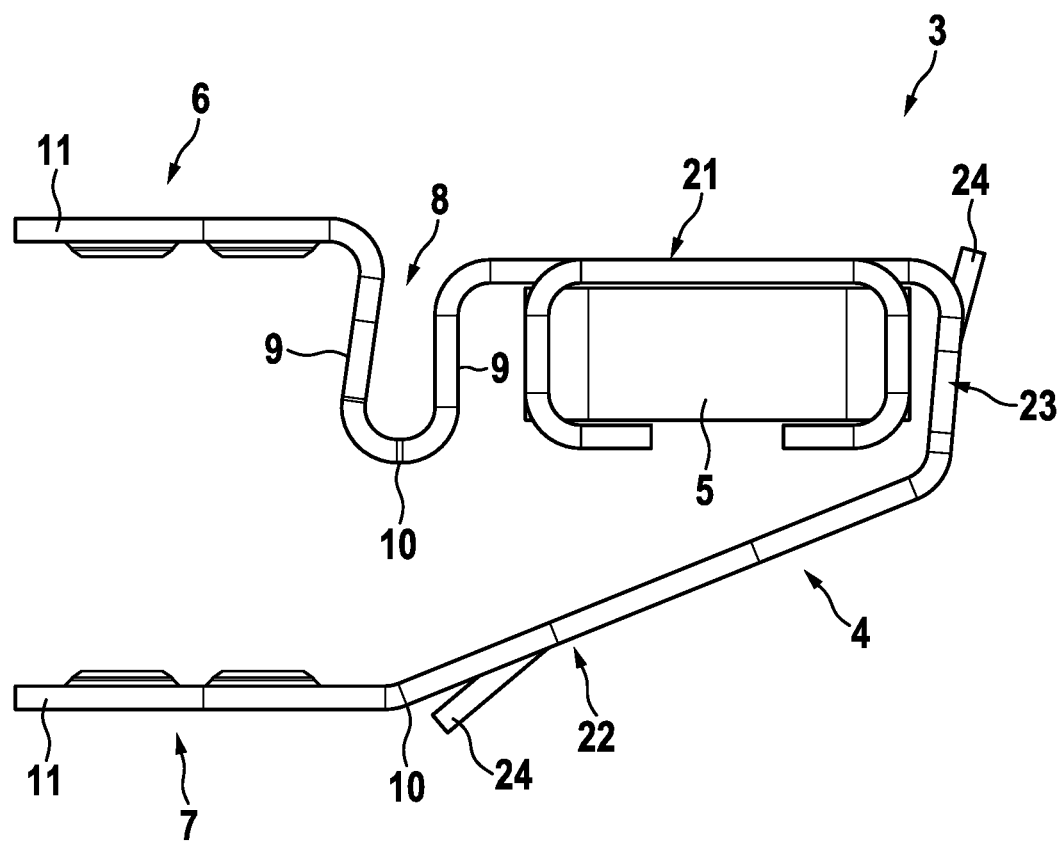
FIG. 3 shows a cross-sectional view of an embodiment of a plug-in nut.

FIG. 3 shows a cross-sectional view of an embodiment of a plug-in nut 3. The cross-sectional view shown shows, in particular, a possible geometric design of the receptacle 8. Accordingly, the receptacle 8 is essentially U-shaped and can in particular be designed as a sheet metal fold. As shown, the opposite boundary walls 9 of receptacle 8 extend at an acute angle to each other, so that the folded edge, via which the boundary walls 9 are connected to form receptacle 8, is a (continuous) folded edge of more than 180°.

The plug-in nut 3, except for the threaded nut 5, can in particular be formed as a shaped sheet metal part and, accordingly, the receptacle 8 can also be a sheet metal fold. The plug-in nut also has a clasp 4 with an upper part 21 and a lower part 22, which are connected to each other via a connection section 23. In a transition area between the connection section 23 and the upper part 21 a contact claw 24 is arranged, which serves for potential equalization between the plug-in nut 3 and a profile strut. A further contact claw is arranged on the outer side of the lower part 24. The actuating ends 6, 7 each have a handle 11, by means of which the clasp 4 of the plug-in nut 3 can be compressed with two fingers and thus preloaded, so that, possibly, an edge of an aperture of a profile strut accommodated in receptacle 8 can emerge from receptacle 8 and thus be disengaged from receptacle 8.

Figure 4:
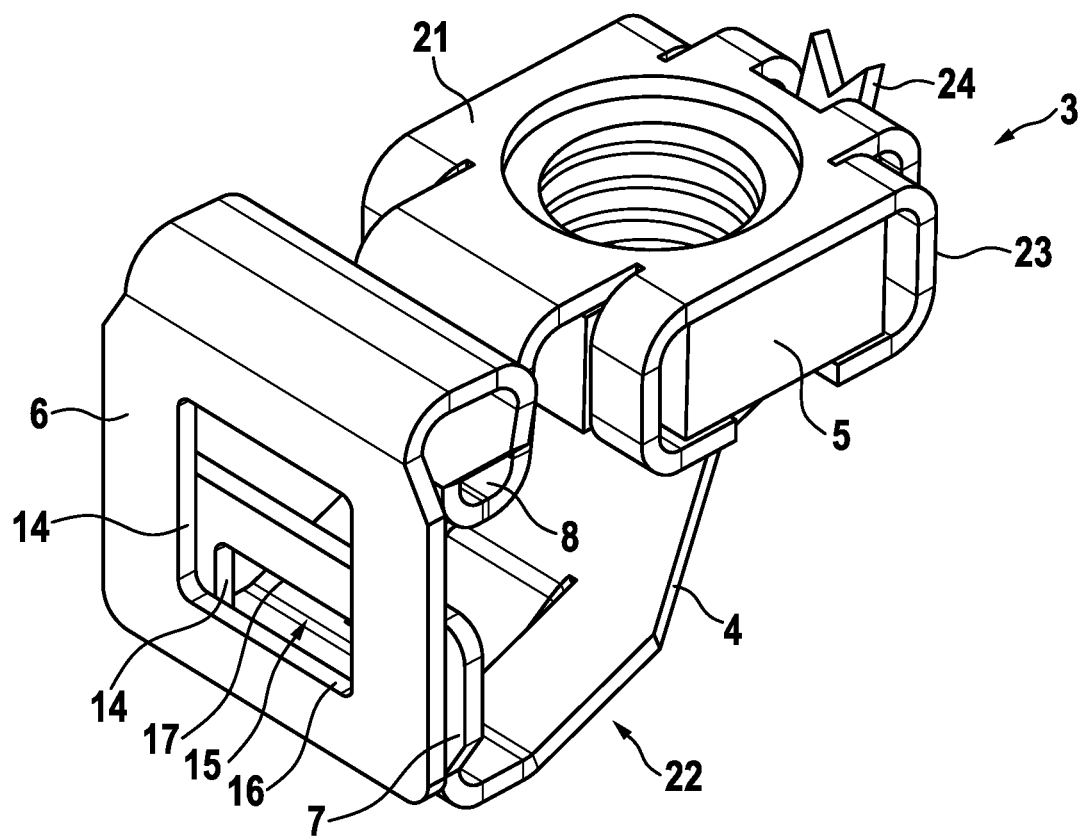
FIG. 4 shows a perspective view of another embodiment of a plug-in nut.

FIG. 4 shows in detail an embodiment in which the actuating ends 6, 7 overlap and are positioned in front of a profile side of the profile strut having the aperture, as well as having aligned tool openings. The aligned tool openings 14 form a tool insertion opening 15 which is delimited by a first boundary edge 16 of a first of the tool openings 14 and oppositely by a second boundary wall 17 of a second of the tool openings 14. In particular, the tool insertion opening 15 can be used to receive a slotted screwdriver as shown in FIGS. 1 and 2.

Figure 5:
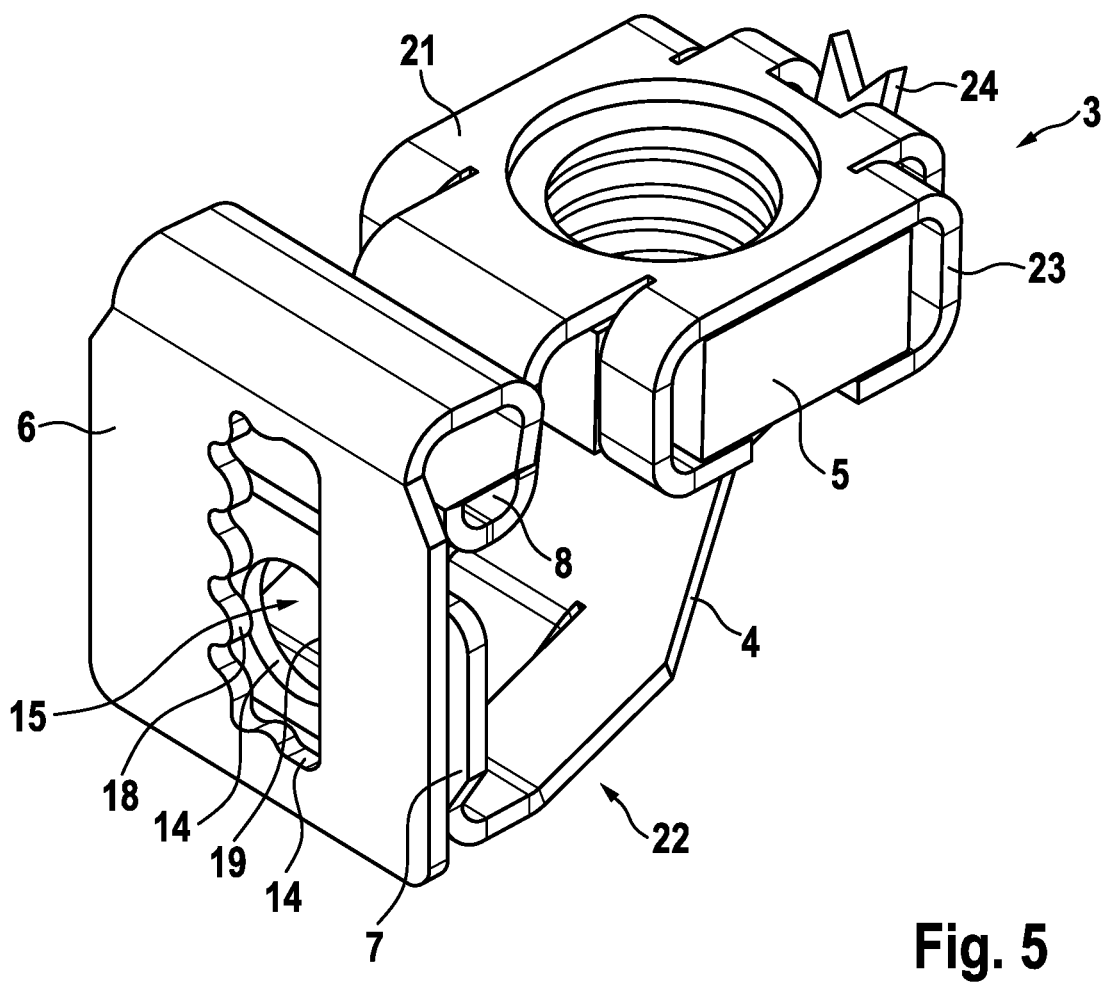
FIG. 5 shows a perspective view of yet another embodiment of a plug-in nut according to the invention.

In a variation of the embodiment shown in FIG. 4, the embodiment shown in FIG. 5 provides that one of the aligned tool openings 14 at a third boundary edge 18 extending in the direction of the adjustment direction of the actuating ends 6, 7 between the locking position and the release position has a toothing of a rack and pinion drive. The fourth boundary wall 19 opposite the third boundary edge 18 is arranged at a distance from the third boundary edge 18 and forms a counter bearing for the toothed drive 20 (see FIGS. 1 and 2) which, as has already been described with respect to FIGS. 1 and 2, can be, for example, a screwdriver with a multi-circular drive, for example a Torx screwdriver.

The tool opening 14 in the second actuating end 7 is circular and has an inner diameter which can essentially correspond to an outer diameter of the previously described toothed drive and thus forms a pivot bearing for the toothed drive.

Figure 6:
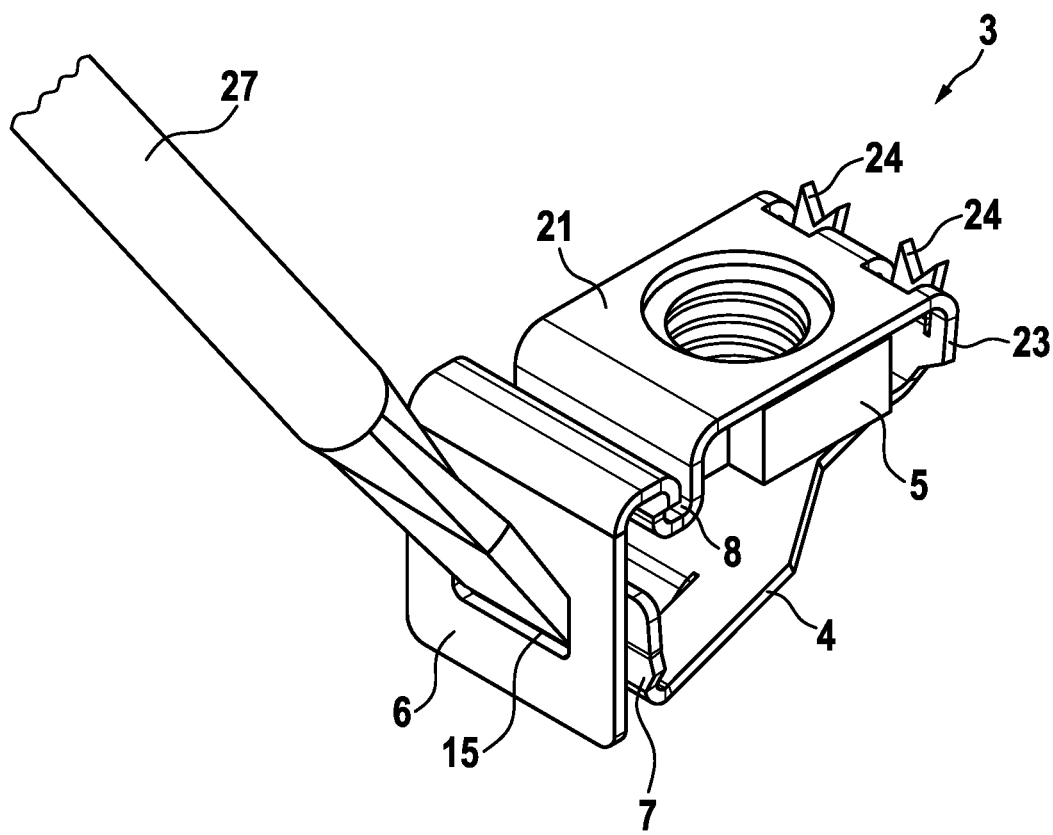
FIG. 6 shows a perspective view of yet another embodiment of a plug-in nut according to the invention.

FIG. 6 shows, in a variation of the embodiment shown in FIG. 4, a plug-in nut 3, in which the threaded nut 5 is formed as a press-in nut (as can in principle be the case for all embodiments), which is pressed in with the upper part 21 and in which the first and the second actuating end 6, 7 extend at an acute angle relative to each other in the shown locking position of the actuating ends unstressed relative to each other, so that the actuating ends 6, 7 can be adjusted relative to each other with the aid of a screwdriver 27 or the like, which is inserted into the tool insertion opening 15, by means of a pivoting movement of the screwdriver 27, so that the actuating ends are transferred into a release position and thereby the plug-in nut is preloaded.

Figure 7:
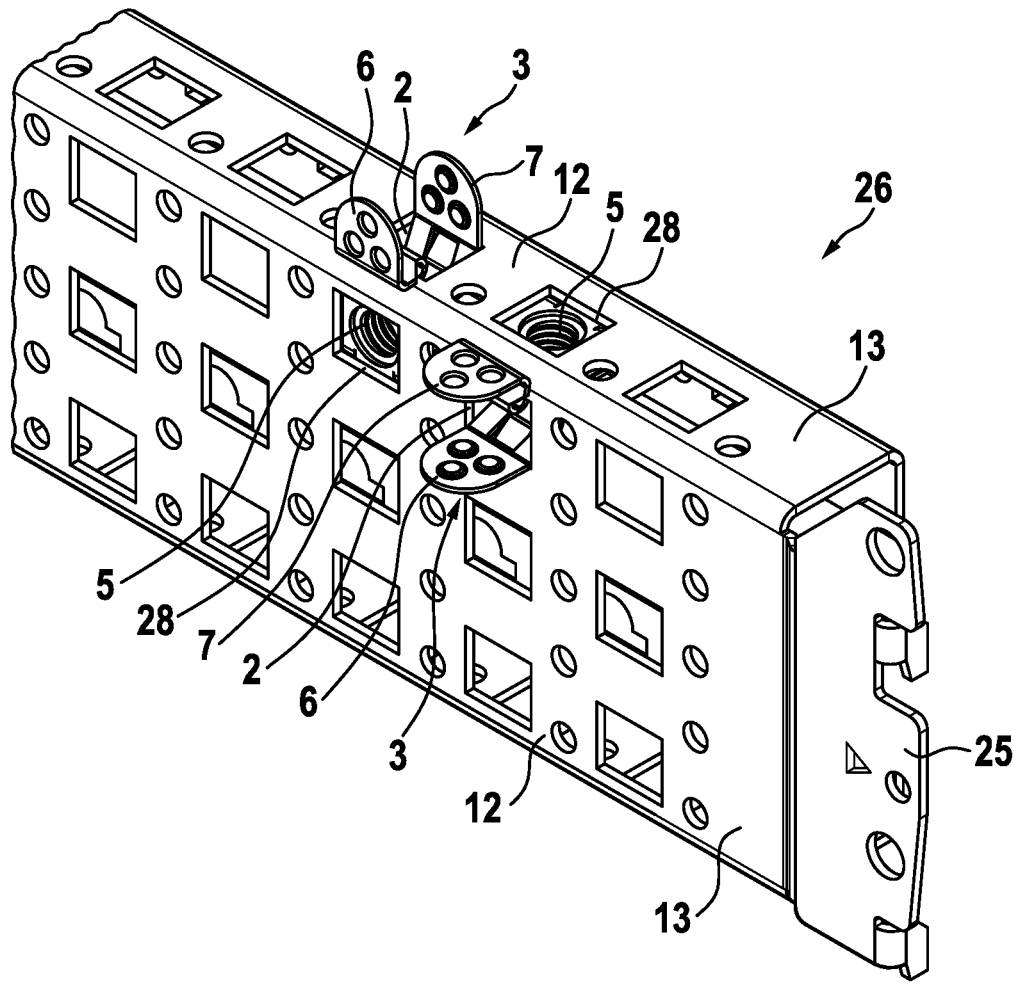
FIG. 7 shows another fastening arrangement according to the invention.
Figure 8:
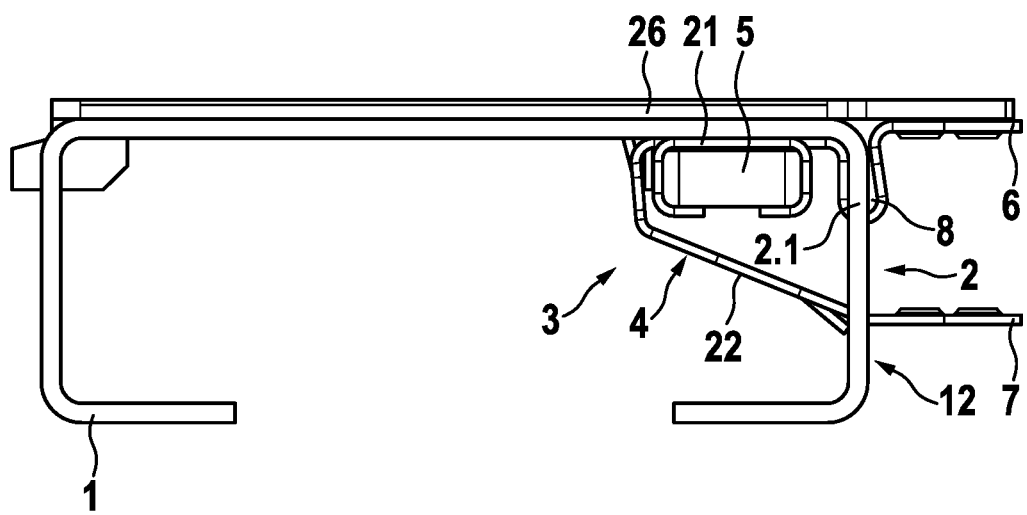
FIG. 8 shows a cross-sectional view of the embodiment according to FIG. 6 perpendicular to the longitudinal direction of the profiled strut.

FIGS. 7 and 8 show a further embodiment of a fastening arrangement according to the invention, in which, via two profile sides 13 of a profile strut 1 which are perpendicular to one another, a plug-in nut 3 is each inserted via a respective aperture 2, so that the threaded nut 5 of the plug-in nut 3 becomes accessible via a respective further aperture 18 in the respective other profile side, for example in order to fix a switchgear component to the interior component 26, which in the present case is designed as a mounting chassis, for the interior installation of a switchgear cabinet. The mounting chassis 26 has a mounting flange 25 at its opposite ends (only one end is shown), which can be used to fix the mounting chassis to the frame of a switch cabinet, for example.

The interior component is not limited to any specific types, but expediently has at least one mounting plane with a system perforation of regularly spaced apertures in which a plug-in nut 3 can be mounted. Additionally, the interior component expediently has a further mounting plane with a system perforation, whereby the further mounting plane extends perpendicular to the first mentioned mounting plane. The apertures in the further mounting plane are provided so that the cage nut for fixing components can be accessed via these apertures.

The features of the invention disclosed in the above description, drawings and claims may be essential for the realization of the invention, either individually or in any combination.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A fastening arrangement comprising:
a profile strut; and
a plug-in nut mounted in an aperture of the profile strut;
wherein the plug-in nut has a threaded nut held on a clasp;
wherein the clasp includes a connection section connecting an upper part and a lower part together in a spaced-apart relationship, a first actuating end forms a first free end of the upper part and a second actuating end forms a second free end of the lower part, the plug-in nut projects out of the aperture by way of the first free end and the second free end;
wherein the clasp further includes at least one of a first projecting contact claw extending from the connection section, and a second projecting contact claw extending from the lower part between the second actuating end and the connection section;
wherein in a locking position of the first actuating end and the second actuating end relative to each other an edge of the aperture is received in a receptacle of the clasp; and
wherein the first actuating end and the second actuating end are overlappingly arranged in front of a profile side of the profile strut having the aperture, the first actuating end defines a first tool opening enclosed by the first actuating end, the second actuating end defines a second tool opening enclosed by the second actuating end, and the first tool opening is aligned with the second tool opening.

2. The fastening arrangement according to claim 1, in which the receptacle is substantially U-shaped and formed on the first or the second actuating end.

3. The fastening arrangement according to claim 1, in which the receptacle is arranged between the first or the second actuating end and the threaded nut.

4. The fastening arrangement according to claim 1, in which the clasp is a shaped sheet metal part and the receptacle is a U-shaped sheet metal folded edge.

5. The fastening arrangement according to claim 1, in which the receptacle has boundary walls spaced apart from each other, of which a first boundary wall, in the locking position, is arranged in front of an inner side of the edge of the aperture, and of which a second boundary wall, in the locking position, is arranged in front of an outer side of the edge of the aperture, opposite the inner side.

6. The fastening arrangement according to claim 1, in which at least one of the actuating ends in a portion, with which the actuating end passes through the aperture, has a dimension in the longitudinal direction of the edge accommodated in the receptacle, which dimension corresponds to a length of the edge in the longitudinal direction.

7. The fastening arrangement according to claim 1, in which, in a release position of the actuating ends relative to each other in which the actuating ends are displaced relative to each other compared to the locking position, the edge of the aperture is out of engagement with the receptacle of the clasp.

8. The fastening arrangement according to claim 1, in which the actuating ends each have a handle which protrude at a distance from each other through the aperture via an outer side of the profile strut and which can be transferred from the locking position into a release position against mechanical preloading of the clasp.

9. The fastening arrangement according to claim 1, wherein the first tool opening and the second tool opening form a tool insertion opening which is delimited by a first boundary edge of the first tool opening and oppositely by a second boundary edge of the second tool opening.

10. The fastening arrangement according to claim 9, in which at least one of the first tool opening and the second tool opening has a toothing at a third boundary edge extending in the direction of an adjustment direction between the locking position and the release position of the actuating ends.

11. The fastening arrangement according to claim 10, in which a fourth boundary edge opposite the third boundary edge is arranged at a distance from the third boundary edge and forms a counter bearing for a toothed drive, in particular for a screwdriver with a multi-circular drive.

12. The fastening arrangement according to claim 10, in which another one of the at least one of the first tool opening and the second tool opening is formed circularly and has an inner diameter which corresponds to an outer diameter of a toothed drive.

13. A switch cabinet housing comprising: the fastening arrangement according to claim 1; wherein the profile strut is either a profile strut of a frame of the switch cabinet housing or an interior component for an interior installation of the switch cabinet housing, in particular a mounting chassis.

* * * * *